(12) United States Patent
Yu

(10) Patent No.: US 7,883,768 B2
(45) Date of Patent: Feb. 8, 2011

(54) BACKLIGHT MODULE, DIFFUSION PLATE AND METHOD OF MANUFACTURING THE SAME

(75) Inventor: Hongjun Yu, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 344 days.

(21) Appl. No.: 12/045,869

(22) Filed: Mar. 11, 2008

(65) Prior Publication Data

US 2008/0268234 A1 Oct. 30, 2008

(30) Foreign Application Priority Data

Apr. 25, 2007 (CN) .......................... 200710098703

(51) Int. Cl.
*B32B 5/18* (2006.01)
*B05D 3/02* (2006.01)
(52) U.S. Cl. ................. 428/308.4; 428/304.4; 428/327; 428/402; 427/372.2; 427/195; 427/407.1
(58) Field of Classification Search ............... 428/36.5, 428/32.17, 304.4, 308.4, 327, 306.6, 402; 257/103; 362/311.03; 359/599; 264/1.6; 427/195, 672.2, 407.1
See application file for complete search history.

(56) References Cited

U.S. PATENT DOCUMENTS

| 6,709,143 | B2* | 3/2004 | Harada et al. ................ 362/558 |
| 2004/0091709 | A1* | 5/2004 | Ohmura et al. .............. 428/404 |
| 2005/0105186 | A1* | 5/2005 | Kaminsky et al. ........... 359/599 |
| 2006/0071231 | A1* | 4/2006 | Han et al. .................... 257/103 |

FOREIGN PATENT DOCUMENTS

| CN | 1755401 A | 4/2006 |
| CN | 1781035 A | 5/2006 |
| CN | 1294427 C | 1/2007 |
| WO | WO-2004097468 | * 11/2004 |

OTHER PUBLICATIONS

Otomura, translation of WO-2004097468 (KR10-20060003901).*

* cited by examiner

*Primary Examiner*—Jennifer C McNeil
*Assistant Examiner*—Lauren Robinson
(74) *Attorney, Agent, or Firm*—Sheridan Ross, P.C.

(57) ABSTRACT

Disclosed is a diffusion plate and a method of manufacturing thereof and a backlight module including the diffusion plate. The diffusion plate comprises a substrate and a diffusion layer applied on the substrate. The diffusion layer comprises a polymer resin and polymer hollow microspheres, and the polymer hollow microspheres are uniformly dispersed in the polymer resin.

11 Claims, 2 Drawing Sheets

BACKLIGHT MODULE, DIFFUSION PLATE AND METHOD OF MANUFACTURING THE SAME

FIELD OF THE INVENTION

The present invention relates to a backlight module of a thin film transistor liquid crystal display (TFT-LCD), a diffusion plate and a method of manufacturing the same.

BACKGROUND OF THE INVENTION

Since liquid crystal itself does not emit light, it is necessary to use an additional light emitting unit to improve the brightness of a display screen in a liquid crystal display. Currently, one of the generally used techniques is a backlight module with a diffusion plate. The diffusion plate is an important component of a backlight module. Not only diffuse reflection effect on the light but also good uniformity and transmissivity are important for a diffusion plate.

In the conventional technology, in order to improve the brightness and uniformity of a diffusion plate, the diffusion plate generally comprises a transparent substrate and a resin layer containing organic particles and/or inorganic particles. As disclosed in the U.S. Pat. Nos. 6,602,596 and 5,831,774, resin particles are bonded onto a substrate with adhesive, forming a coarse surface in a three-dimension structure and thereby improving turbidity and diffusion characteristics of the resultant diffusion plate.

In addition, in the Chinese patent CN1834756, it has been proposed that organic particles or inorganic particles are added into a substrate and pores are generated around the particles by longitudinal and/or lateral stretching of the substrate, and thereby transmissivity and diffusion of the light passing therethrough are improved.

The pores formed as disclosed in CN1834756 may improve transmissivity. Due to presence of the pores, when light enters a substance with relatively low refractivity from another substance with relatively high refractivity, total reflection phenomenon is prone to occur at the interface and thereby the energy loss of the light is reduced. However, the size of the pores is influenced by the varied boundary tension between the resin layer and the substrate and also by the applied stretching force, and therefore it is difficult to obtain satisfied manufacturing consistency, which leads to insufficient uniformity of the light.

Although addition of organic or inorganic particles into a substrate of a diffusion plate may enhance diffusion of light, the light passing therethrough is subject to repeated refractions in the light path before reaching the light outgoing surface of the diffusion plate, so a portion of the energy of the light is lost during the refractions such that the transmissivity of the light becomes relatively low.

SUMMARY OF THE INVENTION

Embodiments of the invention provide a diffusion plate and a method of manufacturing thereof and a backlight module having the diffusion plate. The diffusion plate generates total refraction of light therein with hollow microspheres, such that the energy loss of the light passing through the diffusion plate is greatly reduced, which improves the brightness of the backlight module and the uniformity of the light.

An embodiment of the invention provides a diffusion plate comprising a substrate and a diffusion layer provided on the substrate. The diffusion layer comprises a polymer resin and polymer hollow microspheres, and the polymer hollow microspheres are uniformly dispersed in the polymer resin.

Another embodiment of the invention provides a method of manufacturing a diffusion plate comprising the steps of providing polymer hollow microspheres; mixing the polymer hollow microspheres into a polymer resin uniformly; uniformly applying the polymer resin mixed with the polymer hollow microspheres to a substrate; and curing the polymer resin to form a diffusion layer.

Compared with a conventional diffusion plate, the diffusion plate according to the embodiment of the invention employs the hollow microspheres for light diffusion, total refraction of light is generated in the diffusion layer, such that the energy loss of the light passing through the diffusion plate is greatly reduced, the brightness of the backlight module is enhanced, and at the same time the light has relatively good uniformity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

Figure 1:
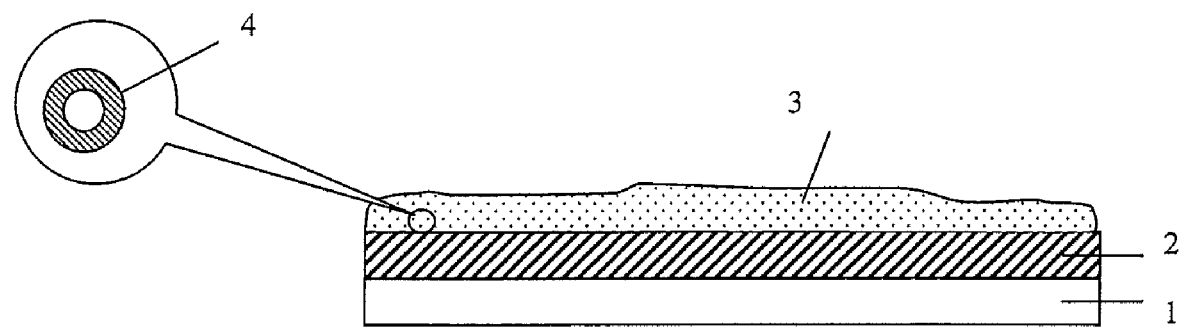
FIG. 1 is a cross-sectional schematic view of a diffusion plate according to an embodiment of the invention.

FIG. 1 is a cross-sectional schematic view of a diffusion plate 10 of an embodiment of the invention, and the insert schematically shows the configuration of one polymer hollow microsphere 4.

As shown in FIG. 1, the diffusion plate 10 according to the embodiment of the invention may be used in a backlight module used for a TFT-LCD and has a three-layer composite structure. The intermediate layer is a substrate 2, at one side of which is formed a diffusion layer with a thickness of from about 25 to about 50 μm comprising polymer resin 3 and polymer hollow microspheres 4, and at the other side of which is formed an antitack layer 1. The outer polymer layer of the polymer hollow microsphere 4 may take on a shape of circle, ellipse, etc. The inner hollow portion may take on a shape of circle, ellipse or other regular or irregular shapes, and the number of the hollow portions in one polymer hollow microsphere 4 may be one or more. The configurations of the hollow portions in one of the polymer hollow microspheres 4 or among the polymer hollow microspheres 4 may be the same or different. The exemplary configurations of the polymer hollow microspheres are described in the following with reference to the accompany drawings.

Figure 2:
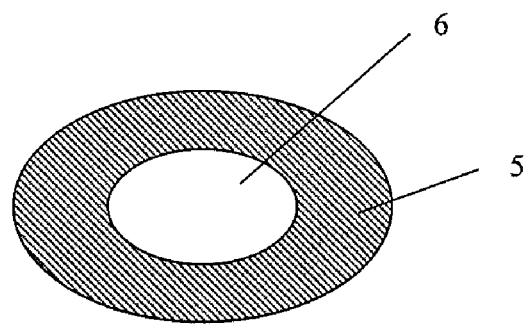
FIG. 2 is a cross-sectional view of one polymer hollow microsphere according to the embodiment of the invention.

FIG. 2 is a cross-sectional view of one polymer hollow microsphere according to the embodiment of the invention. As shown in FIG. 2, the polymer hollow microsphere 4 is composed of an outer polymer layer 5 and an inner hollow portion 6, and as shown in FIG. 2, the cross sections of the outer polymer layer 5 and the inner hollow portion 6 are both ellipse in shape.

Figure 3:
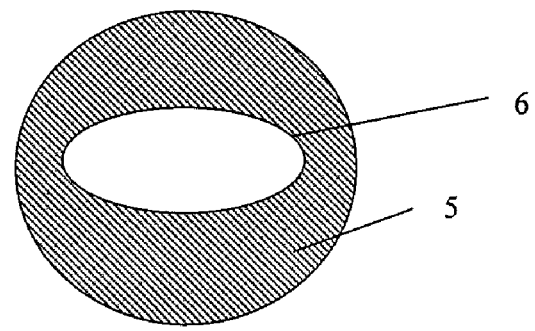
FIG. 3 is another cross-sectional view of one polymer hollow microsphere according to the embodiment of the invention.

FIG. 3 is another cross-sectional view of one polymer hollow microsphere 4 according to the embodiment of the invention. As shown in FIG. 3, the outer polymer layer 5 has a shape of circle, and the inner hollow portion 6 has a shape of ellipse.

Figure 4:
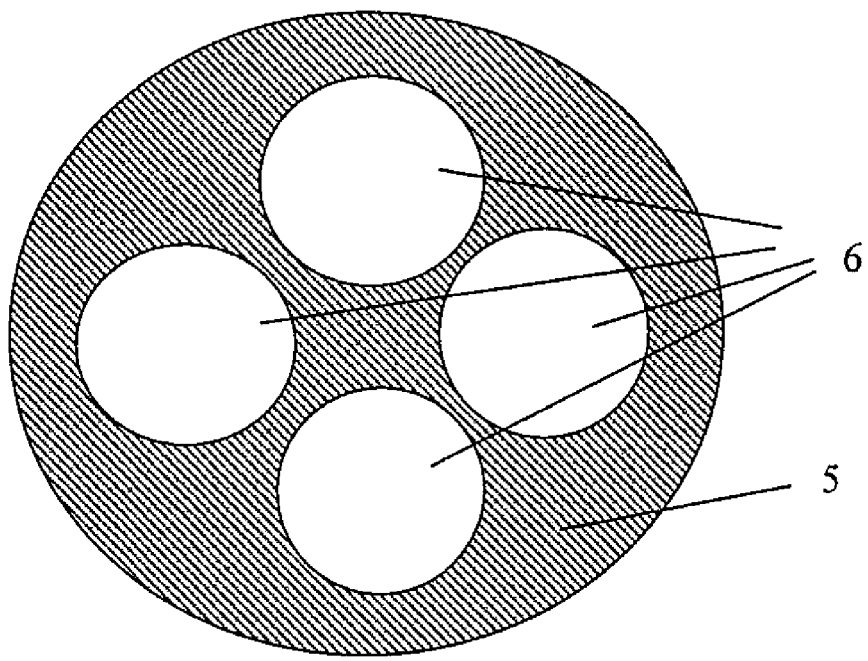
FIG. 4 is another cross-sectional view of one polymer hollow microsphere according to the embodiment of the invention.

FIG. 4 is another cross-sectional view of one polymer hollow microsphere 4 according to the embodiment of the invention. As shown in FIG. 4, the polymer hollow microsphere 4 is composed of the outer polymer layer 5 and four inner hollow portions 6, and the cross sections of the outer polymer layer 5 and the inner hollow portions 6 are all circle in shape.

Figure 5:
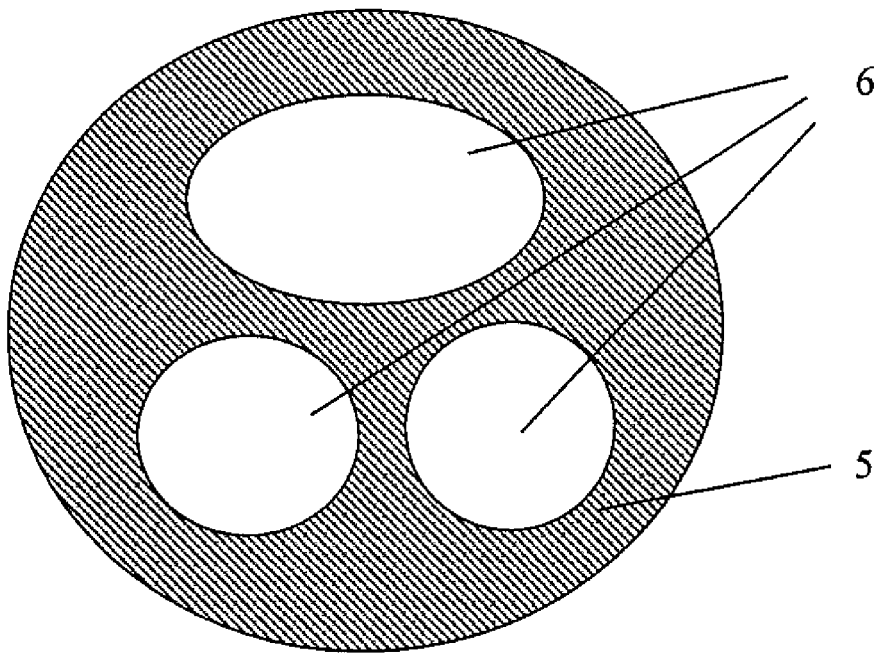
FIG. 5 is another cross-sectional view of one polymer hollow microsphere according to the embodiment of the invention.

FIG. 5 is another cross-sectional view of one polymer hollow microsphere 4 according to the embodiment of the invention. As shown in FIG. 5, the polymer hollow microsphere 4 is composed of the outer polymer layer 5 and three inner hollow portions 6, and the outer polymer layer 5 is circle in shape. Among the three inner hollow portions 6, one is ellipse in shape and the other two are circle in shape.

The accompany drawings only illustratively describe the polymer hollow microsphere according to the embodiment of the invention, which may be varied in many ways and should not be construed as limits of the invention.

In general, when light travels from an optically thicker medium into an optically thinner medium, total reflection may occur at the interface between the optically thicker medium and the optically thinner medium. In the hollow microsphere structure according to the embodiment of the invention, the outer polymer layer is formed of an optically thicker medium with respect to the inner hollow portion which is an optically thinner medium. When the light emitted from a light source of the backlight module reaches the polymer hollow microspheres through the substrate, most of the light is totally reflected at the surface of the polymer hollow portion, enabling most of the light pass through the diffusion plate. Therefore, the energy loss of the light passing though the diffusion plate is greatly reduced and the brightness of the whole backlight module is improved. At the same time, the hollow microspheres have a certain range of the particle diameter distribution, such that the light is of good uniformity.

In the diffusion plate 10 according to the embodiment of the invention, the antitack layer 1 is used to prevent the diffusion plate 10 from adhering to the other component of the backlight module and at the same time to avoid adhering of dust when temperature is changed. It is understandable to those skilled in the art that the antitack layer 1 may be absent in the diffusion plate 10 or replaceable by other component functioning similarly as necessary.

The diffusion plate according to the embodiment of the invention may be manufactured through the following steps:

step 1, preparing or providing the polymer hollow microspheres 4;

step 2, mixing the polymer hollow microspheres 4 into the polymer resin 3 uniformly for example by stirring;

step 3, uniformly applying the polymer resin 3 mixed with the polymer hollow microspheres to one side of the substrate 2;

step 4, curing the polymer resin 3 by further processing; and step 5, applying or attaching the antitack layer 1 on the other side of the substrate 2.

A polymer hollow microsphere is a kind of special core/shell composite materials, the optical, thermal, electrical, and magnetic characteristics of which can be controlled by adjusting the structure, size and the composition of the core/shell material. Due to the relatively large difference of refraction index between the outer polymer layer and the hollow portion of the polymer hollow microsphere, light can be diffused and refracted effectively. The polymer hollow microsphere can be used in the field of coating material and the like as opacifier, uvioresistant additive, etc. Currently, the methods for preparing the polymer hollow microsphere mainly comprise: extraction process, templating, self-assembly, swelling process and the like. The templating and self-assembly methods are advantageous in accurately controlling the morphology and the size but have the drawbacks that the whole process is complicated and has strict requirement on the reaction system, and therefore the practical application of them is limited. Swelling process is a classic method for preparing the hollow microspheres, and the prepared microspheres have uniform diameter distribution and easily controlled morphology, and therefore it has become a highly promising method in industry.

The exemplary materials used for the substrate 2 and the polymer resin 3 may comprise, for example, PMMA and polyester, respectively. The way in which the polymer resin 3 is cured can be, for example, photo-curing method, thermal curing method and the like according to the selected material therefor.

For the diffusion plate prepared by the above method, the polymer hollow microspheres are used as the main component for diffusing light, and therefore the light transmissivity of the resulted diffusion plate is enhanced and the light loss is reduced, and the utilization ratio of the light emitted from the light source is improved and thereby the power consumption of the backlight module is reduced under the same brightness.

Another embodiment of the invention relates to a backlight module used for a TFT-LCD. The backlight module comprises, for example, the above described diffusion plate 10, and further comprises other components such as a light source, a light guiding board and the like. The light source may be a cold cathode fluorescence lamp (CCFL) or a light emitting diode (LED) and provided at the side of the light guiding board or below the light guiding board.

Although the present invention has been described in detail referring to the preferred embodiments, the above embodiments are used only for illustration and not for the purpose of limitation. Accordingly, it will be understood by those of ordinary skill in the art that it is possible to use other materials and equipments if necessary, and that various modifications or equivalent alterations may be made to the embodiments of the present invention without departing from the spirit and scope of the present invention as set forth in the following claims.

What is claimed is:

1. A diffusion plate, comprising:

a substrate; and a diffusion layer provided on the substrate, wherein the diffusion layer comprises a polymer resin and polymer hollow microspheres, and the polymer hollow microspheres are uniformly dispersed in the polymer resin, wherein the polymer hollow microspheres are composed of an outer polymer layer and at least one inner hollow portion, wherein there are a plurality of inner hollow portions in one of the polymer hollow microspheres, and wherein the cross sections of the plurality of inner hollow portions have different shapes.

2. The diffusion plate of claim 1, wherein the diffusion layer has a thickness of from about 25 to about 50 μm.

3. The diffusion plate of claim 1, wherein the cross section of the outer polymer layer has a shape of circle or ellipse.

4. The diffusion plate of claim 1, wherein the material used for the substrate and the polymer resin is PMMA and polyester, respectively.

5. The diffusion plate of claim 1, further comprising an antitack layer provided on the other side of the substrate opposite to the diffusion layer.

6. A backlight module, comprising the diffusion plate of claim 1.

7. The backlight module according to claim 6, further comprising a light source and a light guiding board.

8. A method of manufacturing a diffusion plate, comprising the steps of:

providing polymer hollow microspheres;

mixing the polymer hollow microspheres into a polymer resin uniformly;

applying uniformly the polymer resin mixed with the polymer hollow microspheres to a substrate; and curing the polymer resin to form a diffusion layer, the diffusion layer comprises the polymer resin and polymer hollow microspheres and the polymer hollow microspheres are uniformly dispersed in the polymer resin, wherein the polymer hollow microspheres are composed of an outer polymer layer and at least one inner hollow portion, wherein there are a plurality of inner hollow portions in one of the polymer hollow microspheres, and wherein the cross sections of the plurality of inner hollow portions have different shapes.

9. The method of claim 8, wherein curing the polymer resin is performed by photo-curing or thermal curing.

10. The method of claim 8, further comprising a step of providing an antitack layer on the other side of the substrate opposite to the diffusion layer.

11. The method of claim 8, wherein the diffusion layer has a thickness of from about 25 to about 50 μm.

* * * * *